United States Patent [19]

Gabay

[11] Patent Number: 4,770,635

[45] Date of Patent: Sep. 13, 1988

[54] PORTABLE VIEWER

[76] Inventor: Howard J. Gabay, 48 E. 13th St., New York, N.Y. 10003

[21] Appl. No.: 880,005

[22] Filed: Jun. 30, 1986

[51] Int. Cl.⁴ ............................................. G09B 17/02
[52] U.S. Cl. ................................. 434/178; 434/184; 434/258
[58] Field of Search ............... 40/361, 366, 486, 488; 434/178, 184, 181, 258

[56] References Cited

U.S. PATENT DOCUMENTS

| | | | |
|---|---|---|---|
| 140,135 | 6/1873 | Hildreth | 434/178 |
| 380,166 | 3/1877 | Benninghaus | 40/488 |
| 817,902 | 4/1906 | Bunkers | 350/235 |
| 889,352 | 6/1908 | Bold | 350/242 |
| 1,582,810 | 4/1926 | Whitehead | 434/178 |
| 2,692,444 | 10/1954 | Lindsley | 434/185 |
| 2,777,230 | 1/1957 | Brown | 40/486 |
| 3,409,347 | 11/1968 | Vogel | 350/242 |
| 3,421,233 | 1/1969 | Gaal | 434/178 |
| 3,747,589 | 7/1973 | Harrison et al. | 434/258 |
| 4,016,659 | 4/1977 | Merrigan | 434/181 |
| 4,055,908 | 11/1977 | Greene et al. | 434/178 |
| 4,071,883 | 1/1978 | Dennis | 40/361 |
| 4,078,319 | 3/1978 | Mazeski | 434/178 |
| 4,089,593 | 5/1978 | Bernard et al. | 350/236 |
| 4,177,593 | 12/1979 | Lockey | 40/488 |
| 4,508,216 | 4/1985 | Kelman | 350/242 |

Primary Examiner—Gene Mancene
Assistant Examiner—Wenceslao J. Contreras
Attorney, Agent, or Firm—Michael J. Striker

[57] ABSTRACT

A portable viewer for reading, which has a rectangular-shaped case. The case has two sides parallel longitudinally and two sides parallel widthwise. Each side has an inner edge so that the four inner edges define a viewing slot. A sliding panel is slidably movable longitudinally between the longitudinal inner edges and has a width at least as wide as the widthwise inner edges. A shutter is slidably movable traversely between the widthwise inner edges and has a length at least as long as the longitudinal inner edges. A clear tinted lens rests on the sliding panel and can be extended beyond the end of the sliding panel into the viewing slot. A magnifying lens is provided at the top of the case in the viewing slot to distinguish the viewing field from the rest of a page. Internal illumination is provided, which also helps to distinguish the viewing field.

37 Claims, 3 Drawing Sheets

PORTABLE VIEWER

BACKGROUND OF THE INVENTION

Most cultures have a form of communication known as language. Most languages have a visual symbolic code to communicate in a visual manner. In America and many other countries today, English and Spanish are the primary languages used.

In English and Spanish, the written form of communication are letters in combination to visually depict the verbal code of language. Each letter has a specific sound or sounds and in combination these letters have been given meaning. The visual depiction of the word in English and Spanish is read from left to right. This is called reading the written word. A line of symbols are read from left to right and from the top to the bottom of the page.

The present invention relates to a portable viewing instrument to aid readers and/or the visually limited. Reading can be very difficult for many people, particularly for those who have limited vision and/or have a learning disability such as Dyslexia.

For many, the process of reading is an ordinary task. However, for many people, it is difficult to translate and read the language symbols (words) in a comprehensive manner. These people have a reading difficulty. Their eyes wander about the page of print, randomly moving up, down, right, left. They lose their place and their direction so that the focus of the reading process becomes blurred. For them, it is not a simple task to move their eyes from left to right, and from the top of the page to the bottom of the page, combining the symbols in a correct manner to make sense of the written print. Further, it is often difficult for these individuals to properly use phonetic skills to decode and blend a group of symbols into a meaningful word.

Problems may arise from the lack of repetitive experiences in the gross motor developmental area (i.e. left-right motor movement), which is necessary if further learning in the fine motor area is to take place (i.e. eye-hand coordination, left-right eye movement). Reading Readiness experiences are necessary in the gross and fine motor area for the student to master the proper learning of skills in reading.

Some common characteristics of the visually limited or reading disabled person include:

1—A need for boundaries and limitations.

2—A perceptual difficulty reflecting the inability to grasp gestalts, including a difficulty in integrating a form as a meaningful whole.

3—A difficulty in filtering out unimportant surrounding stimuli and in separating the form from the background.

4—A problem in separating a figure from the ground, such as an inability to perceive and meaningfully separate objects in the foreground and background.

5—A problem with directionality.

6—A difficulty in visual-motor coordination.

7—A difficulty in organizing space because they may be disorganized.

8—Distractability and being unable to attend.

9—Dyslexia, which is a lack of ability to read. Such persons are unable to learn what letters look like or what sounds go with the letters.

One of the primary difficulties for individuals with reading difficulties has been the task of structuring the viewing field to consistently isolate one line of print at a time, moving the eye smoothly from left to right. Another has been the task of isolating a single word and blending the correct sounds from left to right. Since most of the English language is phonetic, proper use of phonetic skills would of course simplify the reading process.

Individuals with reading difficulties have been faced with using their vision alone, with their fingers or a sheet of blank paper used to isolate a single word or a single line of print in the reading process. For many, this does not provide enough consistent structure to master the reading process.

Another tool or method of instruction has been the use of Flash Cards. These are individual small cards on which a word or group of words are written to be seen in isolation. The difficulty with this method is that not enough structure is provided and the placement of the word is too far removed from the context of other written words. Further, the reader must be in possession of many cards. Much preparation is necessary before study can begin.

Since gross motor movement is learned before fine motor movement, it is necessary that the correct pattern of eye-hand coordination be developed and incorporated in the learning process, in order to master the reading task. Thus far, there has not been a device which can consolidate the eye-hand coordination process that is required for reading.

When a person has a broken leg, a crutch is needed while the leg is getting stronger and healing. Similarly, when a person has a viewing problem, an academic crutch is required. A concrete, physical aid to learning is needed to positively motivate the student to learn.

In order for a positive emotional experience to develop for a learner during the learning process, it is essential that the crutch or device be used and not removed from the learner until he or she feels ready to attempt the process without the device. It is unwise to forcefully remove a crutch from a person who has a broken leg until the leg is fully healed. For if they fall again, before their leg is fully healed, the second break will be harder to mend. The same is true for the reading disabled. A second failure will be more damaging. The emotional trauma of failure may make the student stop the attempt to learn.

It is essential that the learner be allowed to use the aid until he or she is completely ready to continue the reading process without the aid of the device. A child who can walk will rarely choose to only crawl. When the child is ready to read or view without the device, he will do so. A person must be given the opportunity to practice the process independently with enough opportunity for repetition, until success occurs.

SUMMARY OF THE INVENTION

It is an object of the invention to provide an instrument that facilitates the reading process by overcoming problems faced by readers. More specifically, this object is to provide a portable device to consistently structure the reading field and which is easy to use with little practice.

In keeping with this object, and others which will become apparent hereafter, one aspect of the invention resides, briefly stated, in a portable viewer, which has an elongated case forming an elongated viewing slot therein for viewing an image therethrough and at least one adjusting element movable relative to the case to vary the viewing slot to the size of the image.

Preferably, the case is rectangular with longitudinal and widthwise sides. The adjusting elements include a sliding panel, tinted lens, and a shutter. The sliding panel is as least as wide as the viewing slot and the shutters are as least as long as the viewing slot. A magnifying lens and illuminating means are provided to further distinguish images visible through the viewing slot from any other external matter.

It is an important object to provide a limited viewing field to reduce the distractability from the remainder of a page or printed material. A limited viewing field is less confusing and reduces anxiety.

Separating a word or a line of print from the remainder of the page makes the task of focusing consistently on one group of symbols easier, preventing the eye from wandering up or down on the page. Moving the viewing field from left to right encourages proper eye movement from left to right and establishes proper eye-hand coordination.

A second object is to provide a structured form for the development of repetitive gross motor movement from left to right by use of eye-hand coordination in using the sliding panel.

A third object is to provide a device that provides a consistent, easy means of control of visual sensory input and to facilitate and integrate the reading process for instructional purposes and individual practice.

A fourth object is to help overcome the common characteristics of those persons with reading difficulties by retraining and reprogramming the learning process through a structured, consistent, repetitive, self pacing device to pattern the correct learning set in the mind.

A fifth object is to isolate single words and to separate single words into syllables, consonants, vowel sounds, prefixes, suffixes, and root words.

A sixth object is to separate parts of sentences or paragraphs by the use of a colored tinted lens.

Another object is to conform the viewing field of a reader to any size print.

Still another object to help readers establish correct eye movement, such as from left to right for reading English, Spanish, etc. and from right to left for reading languages such as Hebrew.

A further object to provide a device which is portable and can be used repetitively.

Another object is to provide a device for practicing eye movement, eye-hand coordination, reading, spelling, or speech and language skills.

An additional object is to provide a specialized book mark, which keeps a reader's exact place on a page.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
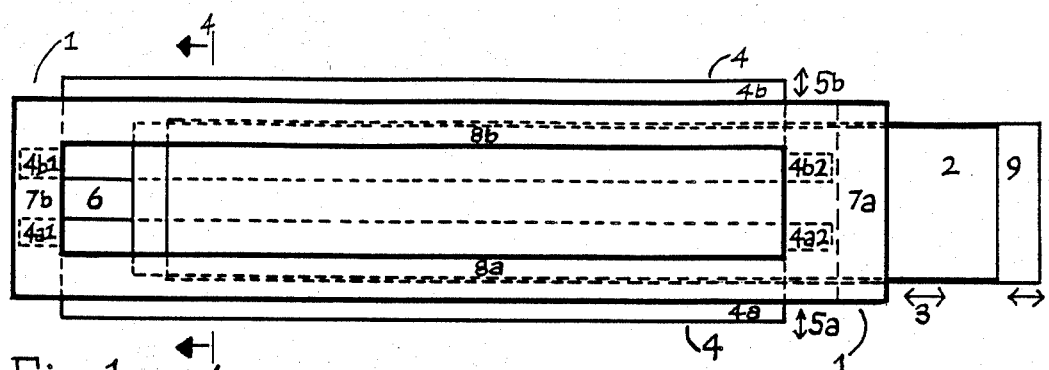
FIG. 1 is a top view of the present invention with the sliding panel, tinted lens, and shutters in various positions limiting the viewing field through the viewing slot. Direction arrows indicate the direction in which the components may move.

Referring now to the drawings, FIG. 1 is a top view of the present invention showing a rectangular-shaped case 1, which may be a molded plastic encasement. A sliding panel 2 may move longitudinally in the direction of arrow 3. A shutter 4, shown in an intermediate open position, has two parts 4a and 4b. Each shutter part 4a, 4b has two associated projections 4a1, 4a2 and 4b1, 4b2, which extend longitudinally as shown. The shutter parts 4a, 4b are movable traversely as indicated by direction arrows 5a and 5b respectfully. A viewing slot 6 is bounded by the two inner edges of widthwise sides 7a, 7b and the two inner edges of longitudinal sides 8a, 8b of the case 1.

A clear tinted lens 9 rests on the upper surface of the sliding panel 2, but is independently movable relative to the sliding panel 2 in the same longitudinal direction. The tinted lens 9 is colored, preferably yellow, and is used to separate parts of a sentence of parts of a paragraph by moving the tinted lens 9 beyond the end of the sliding panel 2 to cover the viewing slot 6 over the appropriate part of the word, sentence or paragraph. The tinted lens 9 helps to distinguish areas within the viewing slot 6.

Figure 1A:
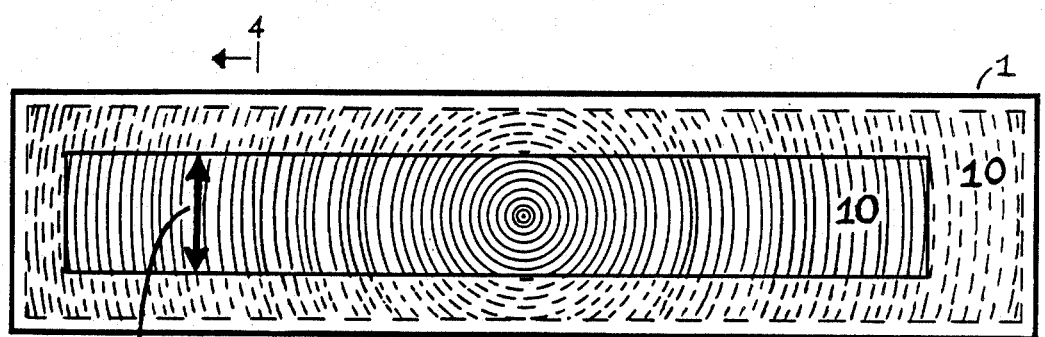
FIG. 1a is also a top view, but only showing the location of the magnifying lens in the case.

FIG. 1a and FIG. 1 are really of the same top view, except that the magnifying lens 10 is the only component shown in FIG. 1a, but was not shown in FIG. 1 for the sake of clarity. The magnifying lens 10 is fitted into the case 1 above the sliding panel 2 and is used, for instance, to enlarge the lettering on a page. This helps to distinguish the viewing field revealed by viewing slot 6 from the remainder of the page. Preferably, the magnifying lens 10 magnifies the entire area of the surface underneath uniformly.

Figure 2:
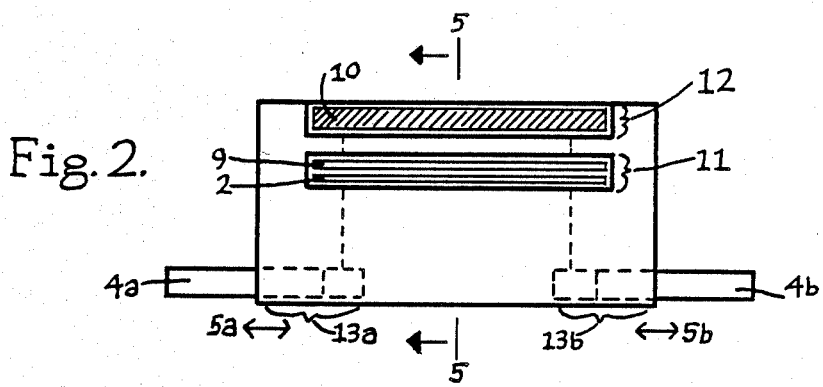
FIG. 2 is a traverse side elevation of a widthwise side having slots as viewed from the right side of FIG. 1.

FIG. 2, a traverse side view, shows a slot 11, through which the sliding panel 2 is movable back and forth. The magnifying lens 10 is inserted through slot 12. The main vertical broken lines show the inner corner edges of the viewing slot 6. Shutter parts 4a, 4b are shown partially out of the case 1 by solid lines and partially in the case 1 by broken lines.

Figure 3:
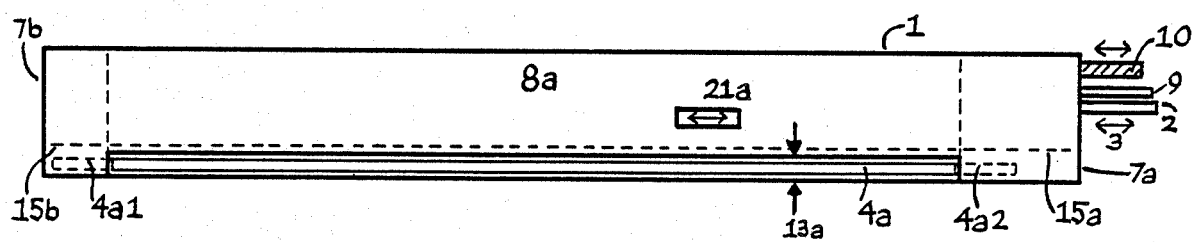
FIG. 3 is a side elevation of a longitudinal side having a slot for a shutter as viewed from the bottom of FIG. 1.

FIG. 3, a longitudinal side view, shows a longitudinal side 8a having slot 13a, through which shutter part 4a is movable back and forth. A similar arrangement exists for longitudinal side 8b, which has a slot 13b, through which shutter part 4b is movable back and forth. As in FIG. 2, broken lines show the shape of a shutter part 4a inside the case 1. Vertical broken lines depict inner corner edges of the viewing slot 6. Horizontal broken lines indicate projective slot 15a and 15b.

Figure 4:
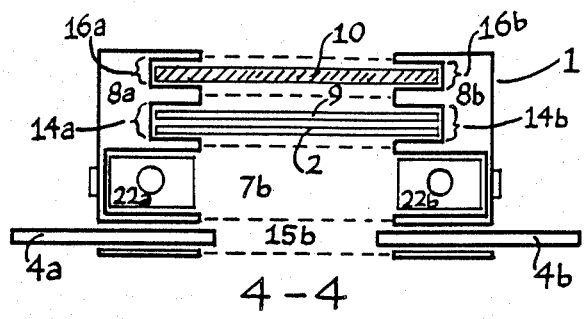
FIG. 4 is a cross-section taken across 4—4 of FIG. 1
Figure 5:
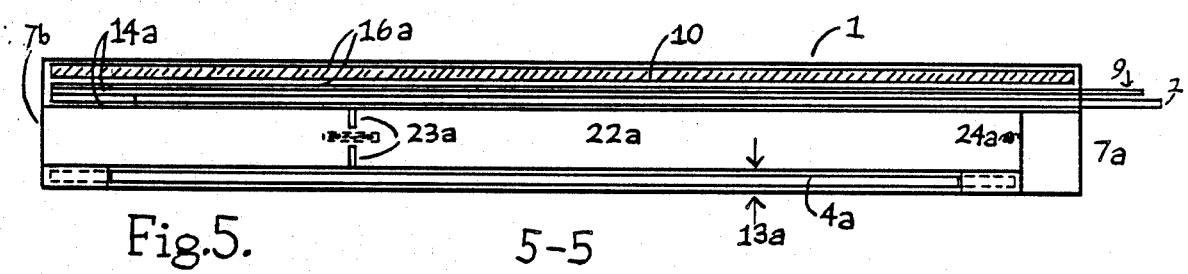
FIG. 5 is a cross-section taken across 5—5 of FIG. 2

FIGS. 4 and 5 show a crossectional and inner edge side views, taken across 4—4 and 5—5 of FIGS. 1 and 2 respectively. The sides of sliding panel 2 engage preformed grooves 14a, 14b in the longitudinal sides 8a,8b after passing through slot 11. This allows the sliding panel 2 to be moved back and forth into the case 1 to block as much of the viewing slot 6 as is desired. The sliding panel 2 may be moved from left to right for reading languages such as English, Spanish, etc. On the other hand, the direction of the case and sliding panel 2 may be reversed and moved from right to left for reading languages such as Hebrew.

The projections 4a1, 4a2 and 4b1, 4b2 of the shutters 4a, 4b respectively are essentially flush against the corresponding widthwise sides 7a, 7b to hold the shutter parts 4a, 4b in their proper set positions. Widthwise grooves 15a, 15b engage the projections 4a1, 4a2 and 4b1, 4b2 respectively. The depth of the grooves 15a, 15b is only slightly larger than the depth of the projections 4a1, 4a2 and 4b1, 4b2, thereby providing a snug fit.

After passing through the slot 11 into the case 1, the sides of the magnifying lens 10 engage preformed grooves 16a, 16b, to keep the magnifying lens 10 in position in the case 1 above the sliding panel 2.

Figure 6:
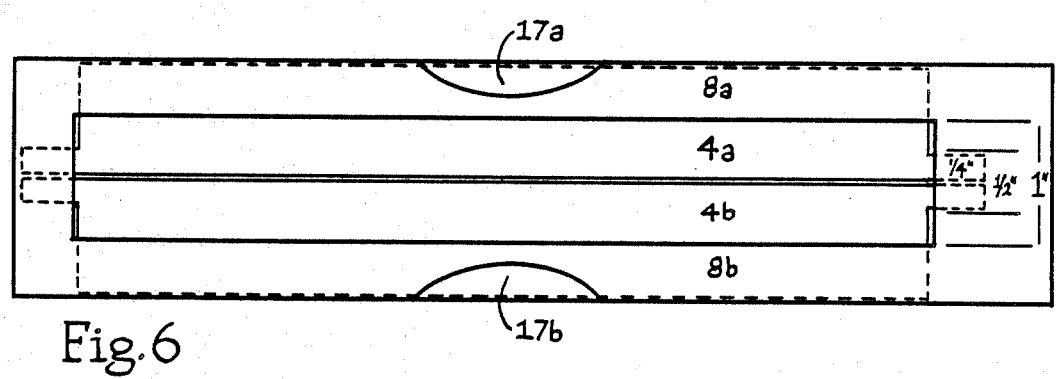
FIG. 6 is a bottom view of the portable viewer showing the shutters in a fully closed position.

FIG. 6 is a bottom view showing the fully closed position of the shutter 4 in broken lines. When in a fully closed position, the shutter parts 4a, 4b help to protect the interior of the viewer. Case 1 also has an arc-shaped cut-outs 17a, 17b which face outward and are centrally located on the bottom of each of the longitudinal sides 8a, 8b respectively to facilitate shutter 4 movement. The shutter parts 4a, 4b can be opened to suit a particular size print or reveal portions of paragraphs. The shutters 4a, 4b also serve to block out extraneous parts of a page, thereby reducing distractions faced by the user.

The shutter parts 4a, 4b can be set for a particular size print setting by adjusting the shutter parts 4a, 4b to the appropriate print setting marked as shown on the bottom of the case 1, such as for 1", ½" and ¼" size print. When the inner edge of the shutters are aligned with the markings, the width of viewing field is limited to the particular size print. The view slot 6 is, therefore, further defined by the longitudinal inner edge of the shutters 4a, 4b.

Figure 7:
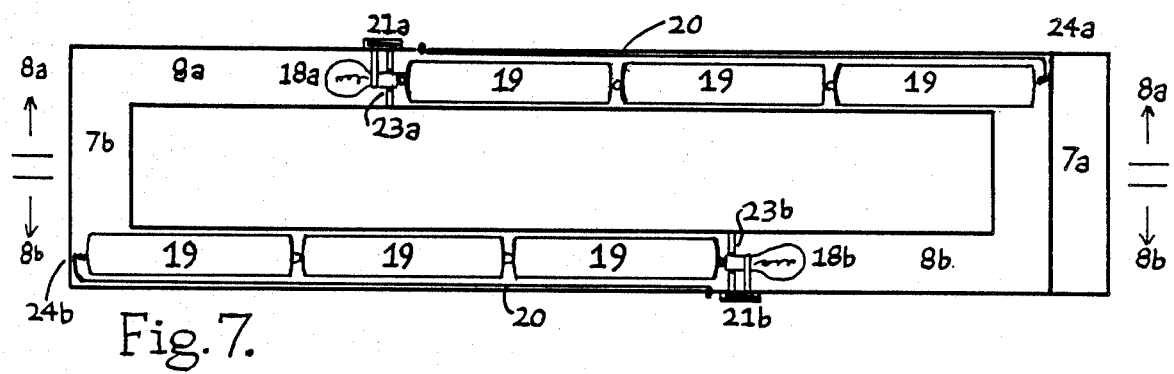
FIG. 7 is a bottom view of the case, exposing a typical interior lighting arrangement.
Figure 8A:
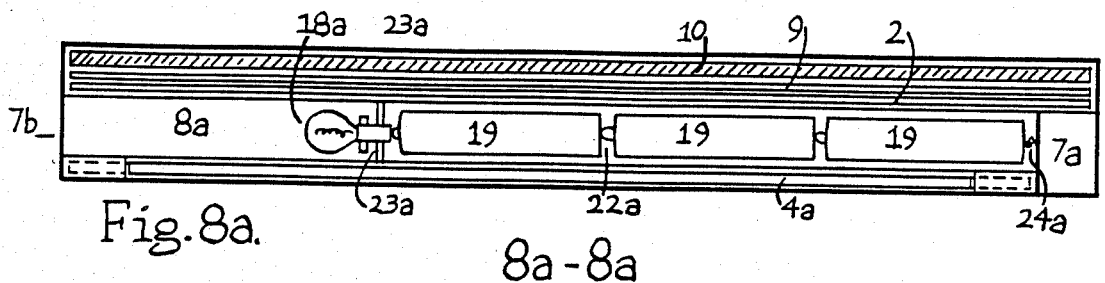
FIG. 8a is a cross-section taken across section lines 8a—8a of FIG. 7.
Figure 8B:
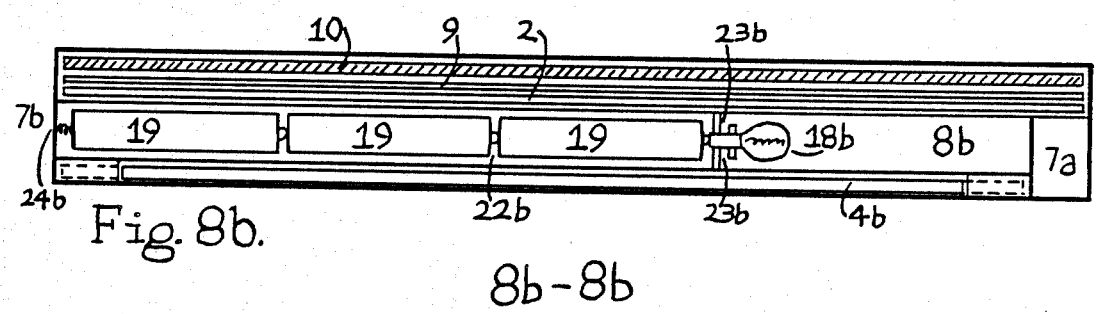
FIG. 8b is a cross-section taken across section lines 8b—8b of FIG. 7.

FIG. 7 is a bottom view of an embodiment showing an interior illumination arrangement. FIGS. 8a and 8b are cross-sectional views taken across section lines 8a—8a, 8b—8b in FIG. 7. Here, light bulbs 18a and 18b are diagonally opposite each other, within longitudinal sides 8a, 8b respectively. Batteries 19 provide the necessary power through wires 20 after electrical contact is made through turning on respective switches 21a, 21b. The batteries 19 are placed in preformed battery grooves 22a, 22b within the longitudinal sides 8a, 8b respectively. The light is held in place for contact with one end of the nearest battery 19 by a holder 23a, 23b within the longitudinal sides 8a, 8b respectively. A spring 24a, 24b is positioned on the interior of the widthwise side 7a, 7b respectively to press the batteries 19 against their respective holder 23a, 23b to establish contact with the light bulbs 18a, 18b. The longitudinal sides 8a, 8b may be removable to permit servicing or replacement of the interior illumination components.

None of the illumination components extend into the viewing slot itself. Longitudinal sides 8a, 8b have a width which is at least as wide as the illumination components, e.g. the batteries 19. More specifically, the battery grooves 22a, 22b are wide enough to completely cover these components above and below. The batteries 19 are, preferably, type AAA and the light bulbs 18a, 18b may be typical small flashlight bulbs.

Figure 9:
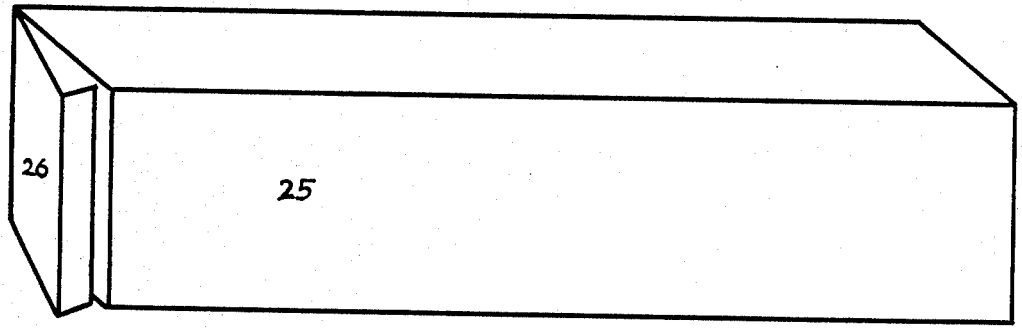
FIG. 9 is a perspective view of a mailer and carrying case lid partially open.

FIG. 9 shows a perspective view of a combination mailer and carrying case 25, which is sized to contain the portable viewer with all its components in a fully closed positon, e.g. sliding panel 2, tinted lens 9, shutter parts 4a, 4b. The lid 26 is shown partially open. The mailer/carrying case 25 may be constructed of cardboard.

Figure 10:
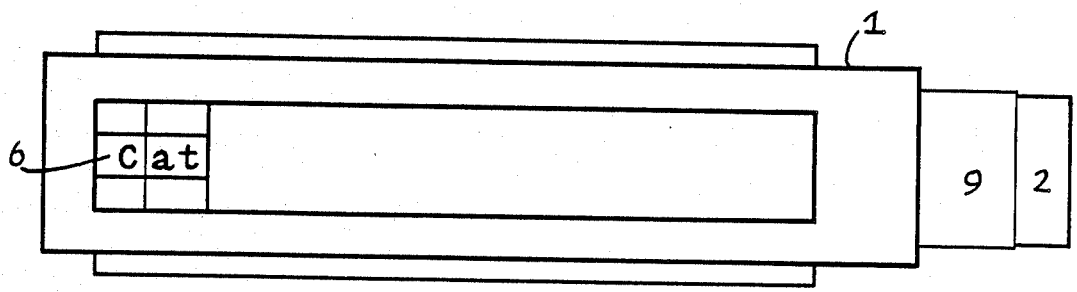
FIG. 10 is a top view demonstrating a typical application of the portable viewer.

FIG. 10 shows a top view of a typical application of the portable viewer, in which the shutter parts 4a, 4b are adjusted to the proper setting to suit the particular size of print. A word, CAT, is isolated by the sliding panel 2. The tinted lens 9 further subdivides the word.

As described, the portable viewer helps readers acquire correct eye movement for reading and improve eye-hand coordination. It can be used to reveal the left side of the page first, when reading from the left to right on a page. It helps pattern gross motor movement because the hand of the reader moves the sliding panel from left to right. The reader may practice with the viewer as much as is necessary, by moving the eye and hand from left to right. The sliding panel movement reinforces the correct left-right movement. The viewer can be used alone to permit self-pacing. The viewer helps to direct correct movement from the top to the bottom of the page. The viewer helps to keep the reader's place in a page or in a book.

The portable viewer device affords, for the first time, the opportunity for a single individual, in an individual selfpacing manner, to independently practice the correct pattern of eye-hand coordination to establish the correct pattern SET in the mind, while integrating the processes necessary for the correct developmental learning sequence for successful reading.

The portable viewer has the necessary components to take the student from Basic Reading Readiness activities through all reading recognition and comprehension skills and, given enough practice, may be used even for speed reading.

The viewer structures the viewing field by helping to differentiate a single word or a few words from the remainder of the line through use of the shutter 4, sliding panel 2 and tinted lens 9 to separate the magnified print or space. Differentiation is effected by physical separation according to size and by shading. Parts of a whole may be separated by the tint of the movable yellow unmagnified lens 9 located above the sliding panel 2. By isolating the print (a word or line of print) and magnifying and illuminating the print, figures can be distinguished from the background and foreground.

The viewer is portable, so that it may be carried on the person or in a handbag or briefcase. It may be hand manipulated. One may practice eye movement directions (left to right or top to bottom), eye-hand coordination, spelling, visual memory, or isolation of various size prints (such as ¼", ½" and 1").

The following procedure may be used to practice for spelling tests:
(a) Look (open sliding panel)
(b) Say (spell aloud)
(c) Close sliding panel (d) Say (spell aloud)

(e) Look (open sliding panel to check for correct spelling)

The following procedure may be used to practice for visual memorization of letters, pictures or numbers:

(a) Look (b) Close sliding panel (c) Say (d) Open sliding panel (e) Check for accuracy The portable viewer can be used for practice repetitively, which makes a child feel less anxious and safer. Children, particularly young children, like exact repetition. It makes them feel the world is consistent so that they then feel safer, more secure and less anxious.

Reading may be learned and practiced with the portable viewer device through many reading methods and approaches. Some examples of Instructional Methods for which it can be used include:

1—Whole word approach to reading—sight words—look—say.

2—Developmental reading—Basal reader

3—Phonetic Approach (word attack skills)

4—Linguistic Structural—Analysis Approach

5—Individualized reading—Self pacing

The device is progressive in that as a reader's skills increase, the device is easier to use. The device progressively advances with the reading level of the user. Since the device is self-pacing, it is easy to set realistic and appropriate goals that can be reached, i.e. to read one word, one sentence, etc. In this manner, satisfaction is assured.

For example—

First grade—Use slowly to decode and blend. Slowly open viewing field by moving the sliding panel and tinted lens from left to right.

Fifth grade—Use more quickly without the tinted lens or movement of the sliding panel (both are used in the fully open position).

The size of the viewing field can be increased or decreased and the isolation of the field is adjustable. The size of the viewing field can be kept for a single word, part of a word, or a whole sentence.

The device can be made in various lengths, such as 9" long or 5½" long. In addition, the device can be used to help Dyslexic readers or by persons whose vision is limited.

Further, the device can be used as a bookmark to keep a reader's place on a page, for instance, at a particular line or word. As such, the device prevents the eye from wandering and corrects directionality (down, left-right). Also, it keeps the place on a page to facilitate copying from a page or book.

In addition, the device can be used to practice correct sequencing, rate and fluency of speech and language skills. For example, the device may be used for repeating sentences to practice the correct use of nouns-verbs, etc.

We are in class.

She is in class.

I am in class.

It will be understood that each of the elements described above, or two or more together, may also find a useful application in other types of portable viewing devices differing from the types described above.

While the invention has been illustrated and described as embodied in a portable viewing device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for the various applications without omitting features that, from the standpoint of prior art, fairly constitute essential characteristics of the generic or specific aspects of this invention.

What is claimed is new and desired to be protected by Letters Patent is set forth in the appended claims:

1. A portable viewer, comprising:

an elongated case forming only one elongated viewing slot extending through all of said case so that a portion of a surface with an image is viewable through said viewing slot and all of said case by both eyes of a reader simultaneously when said case is positioned over the surface; and adjusting means for practicing eye-hand coordination in an individualized self-pacing manner and for acquiring correct eye movement for reading and for learning to read from left to right and for developing gross motor movement, said adjusting means including at least one adjusting element movable in said viewing slot and relative to said case to further limit said viewing slot and thereby limit an amount of the portion of the surface with the image that is viewable through said viewing slot in accordance with a level of skill in reading of the reader and thereby assist the reader in focussing both of the eyes simultaneously and consistently on the image visible through said viewing slot.

2. The portable viewer as defined in claim 1, wherein said adjusting element is a sliding panel movable longitudinally and varying said length of said viewing slot.

3. The portable viewer as defined in claim 1, wherein said adjusting element is a tinted lens strip movable longitudinally and varying said length of said viewing slot.

4. The portable viewer as defined in claim 1, wherein said adjusting element is a shutter movable traversely and varying said width of said viewing slot.

5. The portable viewer as defined in claim 4, wherein said shutter has a first and second part which are movable traversely toward and away from each other for adjusting said width of said viewing slot.

6. The portable viewer as defined in claim 5, wherein the surface contains extraneous matter visible outside said viewing slot, said first and second parts having a portion projectable outward from said case to cover a portion of said surface for differentiating the image to be seen through said viewing slot from said extraneous matter.

7. The portable viewer as defined in claim 1, wherein said case has at least one marking designating said size of said image, said marking being adjacent to said viewing slot, and said adjusting element being movable relative to said marking so as to adjust said viewing slot size to said image size.

8. The portable viewer as defined in claim 1, wherein said case has a slot through which said adjusting element is movable.

9. The portable viewer as defined in claim 1, wherein said case has grooves into which said adjusting element is engagably movable.

10. The portable viewer as defined in claim 1, wherein the surface has extraneous matter visible outside of said viewing slot; further comprising:
   a magnifying lens strip in said viewing slot for differentiating the image to be seen through said viewing slot from said extraneous matter.

11. The portable viewer as defined in claim 10, wherein said magnifying lens strip is formed so that it uniformly magnifies throughout said viewing slot.

12. A portable viewer, comprising:
   an elongated case with only one elongated viewing slot extending through all of said case so that a portion of a surface with an image is viewable therethrough by both eyes of a reader simultaneously;
   adjusting means for practicing eye-hand coordination in an individualized self-pacing manner and for acquiring correct eye movement for reading and for learning to read from left to right and for developing gross motor movement, said adjusting means including at least one adjusting element movable in said viewing slot and relative to said case so as to further limit said viewing slot and thereby limit an amount of the portion of the surface with the image that is viewable through said viewing slot in accordance with a level of skill in reading of the reader and thereby assist the reader in focussing both of the eyes simultaneously and consistently on the image so as to reduce distraction; and
   a magnifying lens strip in said viewing slot for uniformly magnifying the image to be viewed therethrough and for reducing said distraction further, said magnifying lens being formed to uniformly magnify throughout said viewing slot, said case having grooves into which said magnifying lens is engagable.

13. The portable viewer as defined in claim 1, wherein said adjusting member is movable into a closed position in which no portion extends outside of said case; further comprising:
   a container containing said case and said adjusting element in said closed position, said container having one side which is openable for removal of said case and adjusting element.

14. The portable viewer as defined in claim 1, wherein the surface has extraneous matter visible outside of said viewing slot; further comprising:
   illuminating means associated with said case for differentiating the image as viewed through said viewing slot from said extraneous matter.

15. The portable viewer as defined in claim 14, wherein said illuminating means illuminates from within said case.

16. The portable viewer as defined in claim 15, wherein said illuminating means has at least one component, said case having at least one groove sized to receive said illuminating means within said case so that said illuminating means does not protrude into said viewing slot.

17. The portable viewer as defined in claim 1, wherein said adjusting means includes a sliding panel and a tinted lens strip in contact with said sliding panel, said sliding panel being movable longitudinally and said tinted lens strip being movable longitudinally and independently therewith to distinguish areas of the surface visible through said viewing slot.

18. The portable viewer as defined in claim 1, wherein said case is rectangular shaped and has two longitudinal sides and two widthwise sides, each of said sides having an inner edge, said inner edges defining said viewing slot.

19. The portable viewer as defined in claim 18, wherein said adjusting element is formed as a sliding panel slidably movable longitudinally between the longitudinal inner edges for varying said length of said viewing slot, said adjusting means having an additional adjusting element formed as a shutter slidably movable traversely between the widthwise inner edges for varying said width of said viewing slot.

20. The portable viewer as defined in claim 1, wherein the surface is formed as a page in a book, said case being formed for serving as a place holder in the book.

21. A portable viewer, comprising:
   an elongated case forming only one elongated viewing slot extending through all of said case so that a portion of a surface with an image is viewable through said viewing slot and all of said case by both eyes of a reader simultaneously when said case is positioned over the surface, the surface having extraneous matter visible outside said viewing slot; and
   means for differentiating and contrasting the image to be viewed through said viewing slot from said extraneous matter so as to assist the reader in consistently focussing with both of the eyes on the image to be viewed, said differentiating and contrasting means being held by said case and being formed to provide color, uniform magnification, and brightness to the image as viewed through said viewing slot and being formed to include a member slidably movable in said viewing slot in accordance with a level of skill in reading of the reader and to help the reader acquire correct eye movement for reading and practice eye-hand coordination in an individualized selfpacing manner and learn to read from left to right and to develop gross motor movement.

22. The portable viewer as defined in claim 1, wherein said case has an upper plate and a lower plate relative to the surface with the image to be viewed, said upper plate and said lower plate each being formed with an elongated opening therein, said case having a wall fixed between said upper and lower plates and defining an inner space therebetween, said wall being arranged so as to provide an unobstructed view through all of said case through both of said elongated openings and said inner space, both of said elongated openings and said inner space thereby constituting said elongated viewing slot of said case.

23. A portable viewer comprising:
   a viewing element with a planar face that forms only one elongated viewing slot extending through all of said viewing element so that a portion of a surface with an image is viewable through said viewing slot and all of said viewing element by both eyes of a reader simultaneously when said viewing element is positioned over the surface; and
   reducing means for reducing a distractability of a portion of the surface that is visible outside of said viewing slot so as to assist the reader in focussing both of the eyes simultaneously and consistently on the image visible through said viewing slot, said reducing means including at least one reducing element which cooperates with said viewing slot and contrasts said viewing slot and therefore the image from the portion of the surface visible outside of said viewing slot, said reducing element being slidably held in position by said viewing element and being slidably movable across said viewing slot in accordance with a level of skill in reading of the reader so as to help the reader acquire correct eye movement for reading and practice eye-hand coordination in a self-pacing manner and learn to read from left to right and develop gross motor movement.

24. The portable viewer as defined in claim 23, wherein said reducing element is formed to magnify the image more than the surface visible outside the viewing slot.

25. The portable viewer as defined in claim 23, wherein said reducing element is formed to magnify the image uniformly.

26. The portable viewer as defined in claim 23, wherein said reducing element is formed to cover a portion of the surface that is visible outside of said viewing slot and to isolate the image visible through said viewing slot, said reducing element being movable in said viewing slot to isolate the image and being formed so that a portion of said reducing element simulaneously extends outward from said viewing element thereby covering the portion of the surface visible outside the viewing slot.

27. The portable viewer as defined in claim 26, wherein said reducing means further includes a colored tinted lens strip independently movable in said viewing slot so that a portion of said colored tinted lens strip is extendable further into the viewing slot beyond said adjusting element.

28. The portable viewer as defined in claim 26, wherein said reducing means further includes a colored tinted lens strip independently movable relative to said reducing element in said viewing slot, said reducing means further including means for illuminating the image, said illuminating means being directed in said viewing slot rather than at the surface visible outside the viewing slot, said reducing means also including magnifier arranged in said viewing slot.

29. A method of reading with a portable viewer, comprising:
positioning a viewing element with a planar face that forms only one elongated viewing slot extending through all of the viewing element on a surface with an image so that the image is viewable through the viewing slot by both eyes of a reader simultaneously; and
reducing a distractability of a portion of the surface that is visible outside of the viewing slot to assist the reader in focussing both of the eyes simultaneously and consistently on the image visible through the viewing slot, the reducing including contrasting the viewing slot and therefore the image from the portion of the surface visible outside of the viewing slot by slidably moving at least one reducing element across the viewing slot in accordance with a level of skill in reading of the reader so as to help the reader to acquire correct eye movement for reading and to practice eye-hand coordination in an individualized self-pacing manner and to learn to read from left to right and to develop gross motor movement.

30. The method as defined in claim 29, wherein the reducing step includes illuminating the image more than the surface visible outside the viewing slot with the reducing element.

31. The method as defined in claim 29, wherein the reducing step includes magnifying the image uniformly with the reducing element.

32. The method as defined in claim 29, wherein the viewing slot has a size, the reducing step including moving the reducing element so that a portion of the reducing element extends over a portion of the surface visible outside the viewing element and so that another portion of the adjusting element extends in the viewing slot to isolate the image.

33. The method as defined in claim 32, wherein the reducing includes independently moving a colored tinted lens strip in the viewing slot relative to the reducing element so that a portion of the colored tinted lens strip extends further into the viewing slot beyond that of the reducing element.

34. The method as defined in claim 32, further comprising:
closing the viewing slot entirely by moving the reducing element in one direction so that the image is no longer visible;
verbalizing the image; and
opening the viewing slot by moving the reducing element in a direction opposite the one direction so as to again reveal the image to check for accuracy of the verbalizing of the image.

35. The method as defined in claim 32, wherein the surface has a plurality of images arranged in a line so as to be readable in one direction by a reader, the moving of the reducing element including moving the reducing element in the one direction so as to incrementally reveal the plurality of images in the viewing slot in the same one direction and thereby coordinate eye and hand movements of the reader.

36. The method as defined in claim 35, wherein the surface has a plurality of images; further comprising:
progressively reading with the portable viewer and including initially moving the reducing element and colored tinted lens strip to isolate images and subsequently moving the reducing element and colored tinted lens strip completely out of the viewing slot to thereby fully open the viewing slot and then moving the viewing element across the surface to successively view predetermined groups of the images simultaneously.

37. The portable viewer as defined in claim 23, wherein said reducing means includes a plurality of different reducing elements, each of said different reducing elements being formed to cooperate with said viewing slot to independently contrast said viewing slot and being arranged in said viewing element at different locations.

* * * * *